United States Patent
Tong et al.

(10) Patent No.: US 8,379,357 B2
(45) Date of Patent: Feb. 19, 2013

(54) RESISTANCE DETERMINING SYSTEM FOR OVER VOLTAGE PROTECTION CIRCUIT

(75) Inventors: Song-Lin Tong, Shenzhen (CN); Peng Chen, Shenzhen (CN); Qi-Yan Luo, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 92 days.

(21) Appl. No.: 13/172,876

(22) Filed: Jun. 30, 2011

(65) Prior Publication Data

US 2012/0176715 A1    Jul. 12, 2012

(30) Foreign Application Priority Data

Jan. 12, 2011    (CN) .......................... 2011 1 0005833

(51) Int. Cl.
*H02H 3/22* (2006.01)
(52) U.S. Cl. ....................... 361/91.1; 361/111
(58) Field of Classification Search ................... 361/58, 361/91.1, 111
See application file for complete search history.

(56) References Cited

U.S. PATENT DOCUMENTS

| | | | | |
|---|---|---|---|---|
| 5,309,309 | A | * | 5/1994 | Weber .............................. 361/18 |
| 8,179,106 | B2 | * | 5/2012 | Tokura et al. ................. 323/224 |

* cited by examiner

*Primary Examiner* — Danny Nguyen
(74) *Attorney, Agent, or Firm* — Altis Law Group, Inc.

(57) ABSTRACT

A resistance determining system for an over voltage protection (OVP) circuit, includes an external power source, a microcontroller, a digital rheostat and a display unit. The external power source supplies an external voltage to the OVP circuit. The microcontroller stores an over voltage value. The microcontroller is connected to the external power source and configured to detect the external voltage and compare the external voltage with the over voltage value. The digital rheostat is connected to the microcontroller and includes a first rheostat having two connection terminals respectively connected to two first connection ends of the OVP circuit. The microcontroller adjusts the first rheostat to be a first resistance value to activate the OVP circuit when the external voltage is substantially equal to the over voltage value. The display unit is connected to the microcontroller and configured to display the first resistance value.

6 Claims, 4 Drawing Sheets

US 8,379,357 B2

RESISTANCE DETERMINING SYSTEM FOR OVER VOLTAGE PROTECTION CIRCUIT

BACKGROUND

1. Technical Field

The present disclosure relates to resistance determining systems and, particularly, to a resistance determining circuit for determining resistances in an over voltage protection (OVP) circuit.

2. Description of Related Art

Power supply circuits usually include a protection circuit such as an OVP circuit. The OVP circuit will turn off the power supply circuit when an input voltage exceeds a predetermined voltage and will turn on the power supply circuit when the input voltage falls under another predetermined voltage. To respond to the change of the input voltage at the predetermined voltage, the OVP circuit often includes reference resistors which are used in defining and establishing the existence of the predetermined voltages.

Thus, the resistances of the references resistors need to be determined in designing the OVP circuit for a specific power supply circuit. At present, resistors of different resistances are placed into the OVP circuit under design on a trial-and-error basis, to function one by one as the reference resistor, until the OVP circuit under design can accurately respond to the significant change of the input voltage. This trial-and-error method is very inefficient.

Therefore, it is desirable to provide a resistance determining system for an OVP circuit which can overcome the limitations described above.

DETAILED DESCRIPTION

Exemplary embodiments of the disclosure will now be described in detail, with reference to the accompanying drawings.

Figure 1:
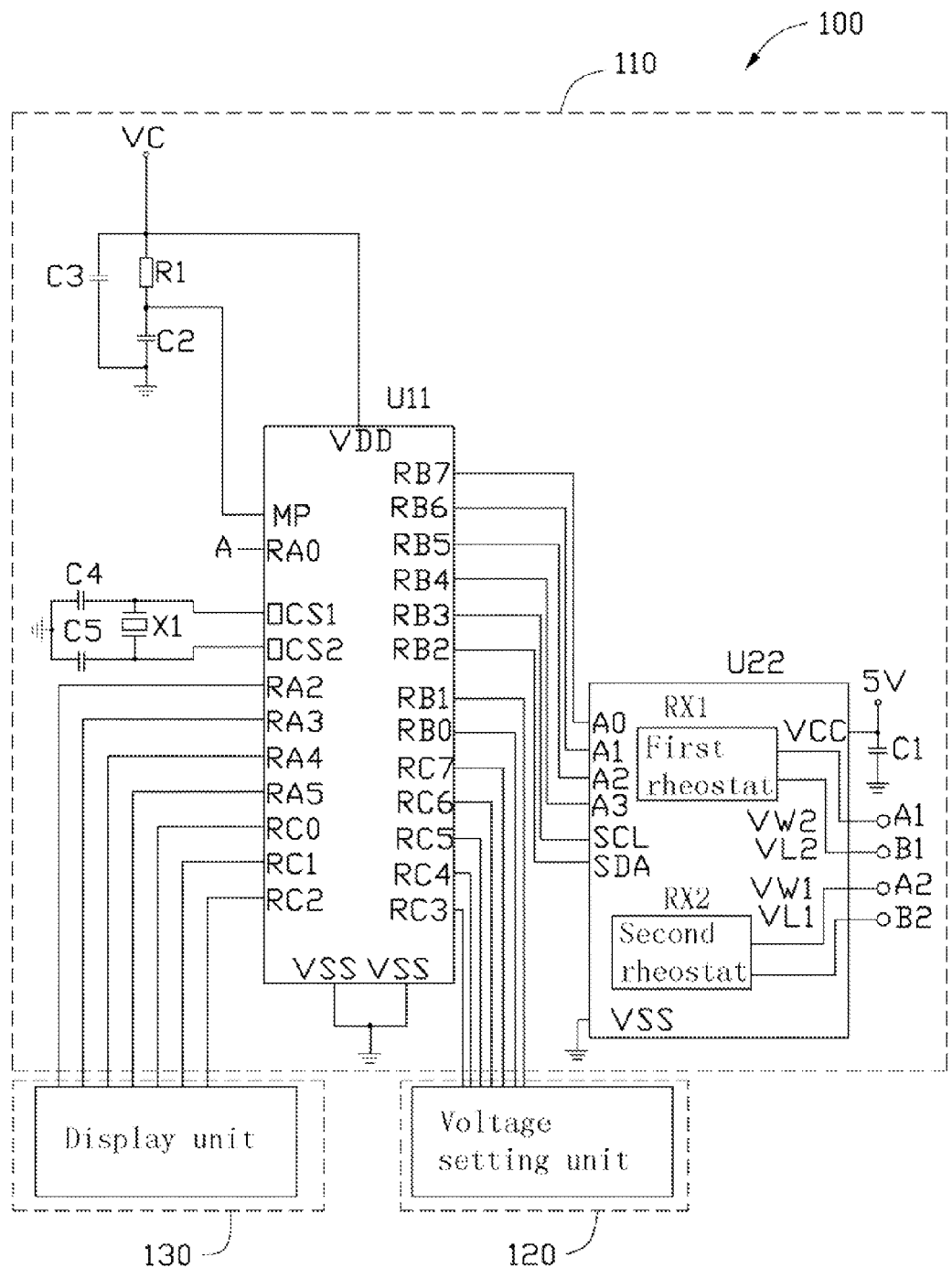
FIG. 1 is a circuit diagram of a resistance determining system, according to an exemplary embodiment.

Referring to FIG. 1, a resistance determining system 100, according to an exemplary embodiment, includes a resistor adjusting unit 110, a voltage setting unit 120, and a display unit 130.

The resistor adjusting unit 110 includes a microcontroller U11, a digital rheostat U22, a first resistor R1, five capacitors C1, C2, C3, C4, and C5, and an oscillator X1.

The microcontroller U11 includes a first voltage terminal VDD, a second voltage terminal MP, an input terminal RA0 (connection end A), two clock terminals CS1 and CS2, six output terminals RB2-RB7, fourteen input/output terminals RC0-RC7, RA2-RA5, RB0-RB1, and a ground terminal VSS.

The first voltage terminal VDD is connected to a power source VC and grounded through the first resistor R1 and the capacitor C2. The second voltage terminal MP is connected between the first resistor R1 and the capacitor C2. The capacitor C3 is connected between the power source VC and ground. The clock terminals CS1, CS2 are grounded respectively through the capacitors C4, C5. The oscillator X1 is connected between the clock terminals CS1, CS2. In one example, the power source VC is about 5 volts.

The digital rheostat U22 includes four input terminals A0-A3, a clock terminal SCL, a data terminal SDA, a voltage terminal VCC, two first connection terminals VL1, VW1, two second connection terminals VL2, VW2, a ground terminal VSS, a first rheostat RX1, and a second rheostat RX2.

The four input terminals A0-A3 are connected to four output terminals RB7-RB4. The clock terminal SCL is connected to the output terminal RB3. The data terminal SDA is connected to the output terminal RB2. The voltage terminal VCC is connected to a power source of about 5 volts and grounded through the capacitor C1.

The voltage setting unit 120 is connected to the input/output terminals RC3-RC7, RB0, and RB1. The voltage setting unit 120 is configured to set an over voltage quantity and a recovery voltage quantity into the microcontroller U11. The microcontroller U11 stores the over voltage value and the recovery voltage value.

The display unit 13 is connected to the input/output terminals RA2-RA5 and RC0-RC2. In one embodiment, the display unit 13 an LCD device.

Figure 2:
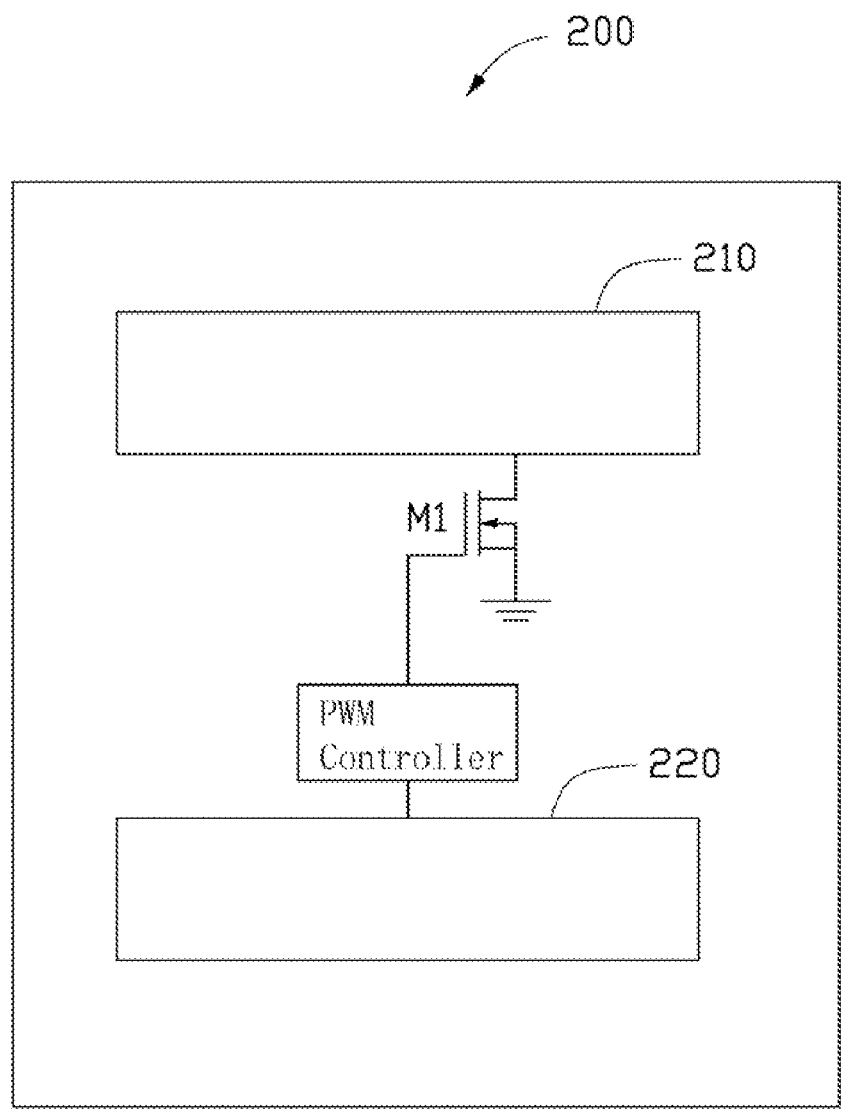
FIG. 2 is a functional block diagram of a power supply circuit, according to an exemplary embodiment.
Figure 3:
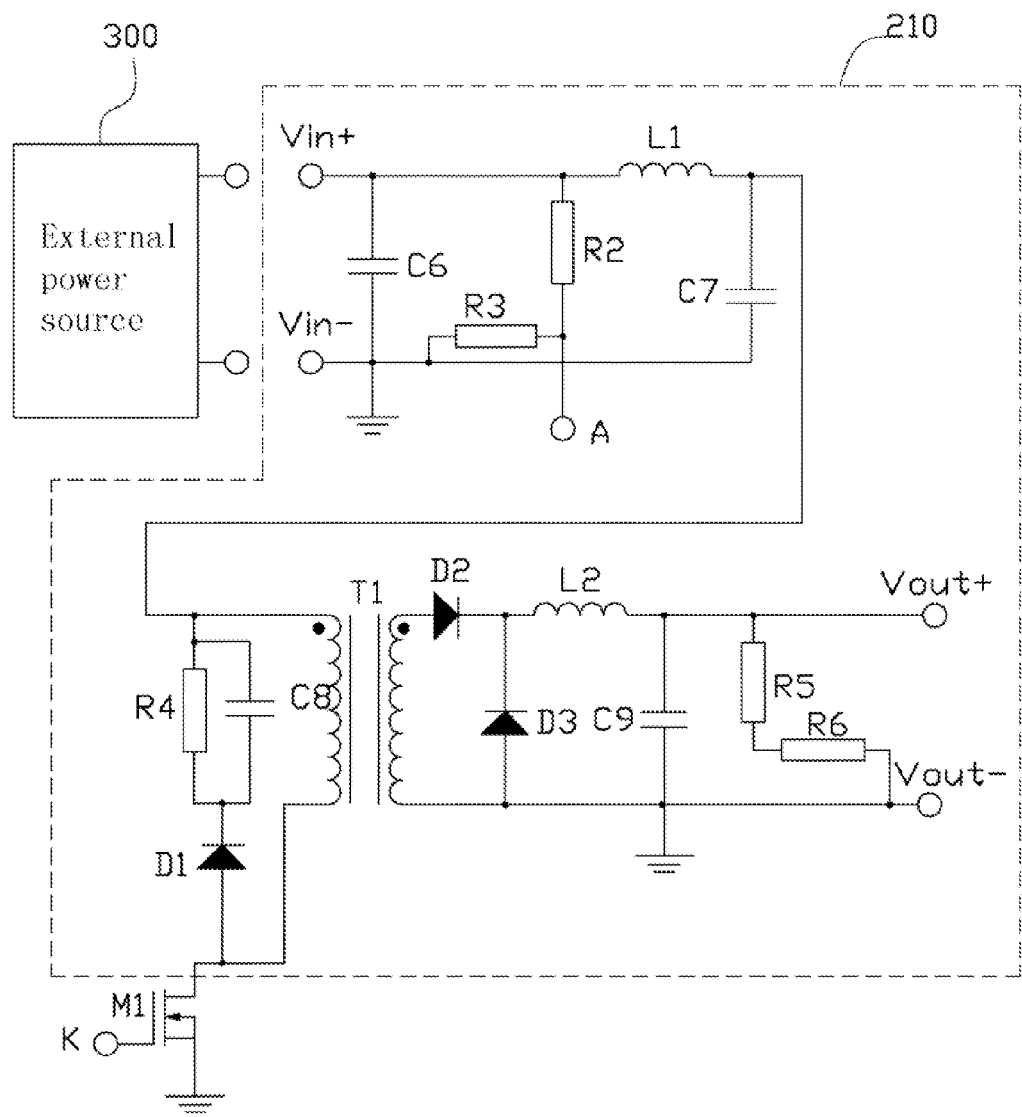
FIG. 3 is one embodiment of a sampling circuit of the power supply circuit of FIG. 2.
Figure 4:
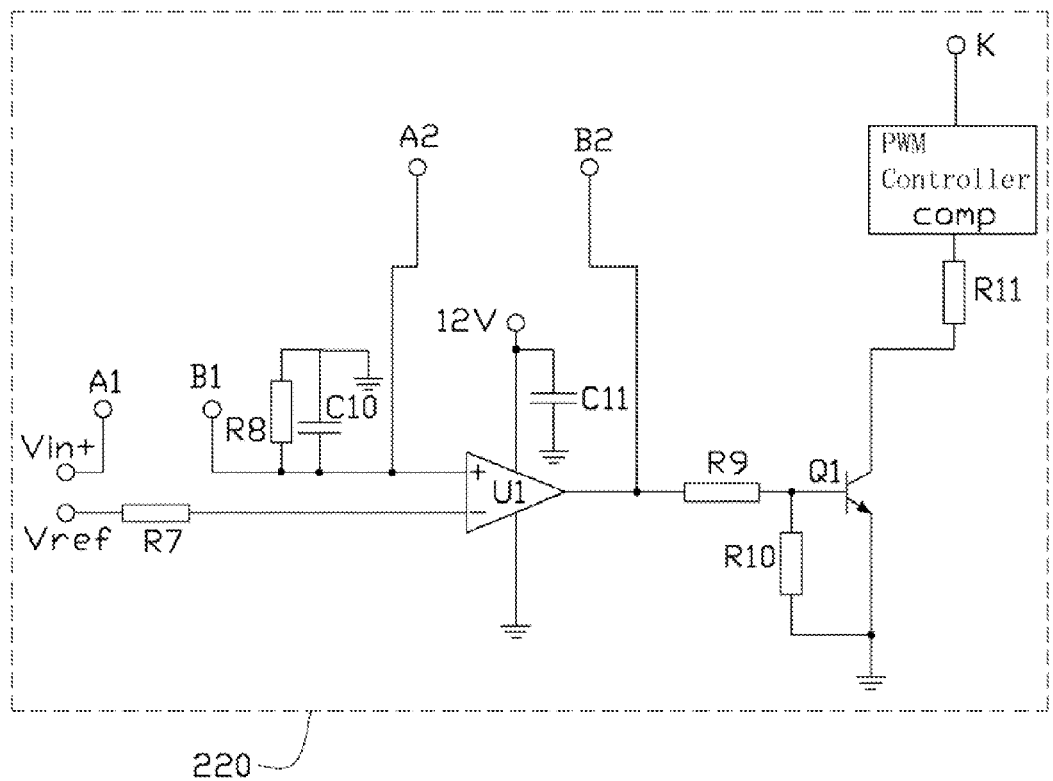
FIG. 4 is one embodiment of an OVP circuit of the power supply circuit of FIG. 2.

Referring to FIG. 2 to FIG. 4, a power supply circuit 200 according to an exemplary embodiment, includes a voltage sampling unit 210 and an OVP circuit 220.

The voltage sampling unit 210 includes two voltage input terminals Vin+ and Vin−, two voltage output terminals Vout+ and Vout−, a transformer T1, five resistors R2, R3, R4, R5 and R6, four capacitors C6, C7, C8, and C9, two inductors L1 and L2, and three diodes D1, D2, and D3. An external power source 300 is connected to the sampling unit 210 through the voltage input terminals Vin+ and Vin−. The voltage input terminal Vin+ is connected to a first primary end of the transformer T1 through the inductor L1. The voltage input terminal Vin− is grounded. The capacitor C6 is connected between the voltage input terminals Vin+ and Vin−. The capacitor C7 is connected between the first primary end of the transformer T1 and the input terminal Vin−. The resistors R2 and R3 are serially connected between the voltage input terminals Vin+ and Vin−. The positive terminal of the diode D1 is connected to a second primary end of the transformer T1, the resistor R4 is connected in parallel with the capacitor C8, and the negative terminal of the diode D1 is connected to the first primary end of the transformer T1 through the resistor R4 and the capacitor C8. In one embodiment, the external power source 300 supplies about 15 volts.

The positive terminal of the diode D2 is connected to a first secondary end of the transformer T1, the negative terminal of the diode D2 is connected to the output terminal Vout+ through the inductor L2. The voltage output terminal Vout− is connected to a second secondary end of the transformer T1 and grounded. The positive terminal of the diode D3 is connected to the second secondary end and the negative end of the diode D3 is connected between the diode D2 and the inductor L2. The capacitor C9 is connected between the voltage output terminals Vout+ and Vout−. The resistors R5 and R6 are serially connected between the terminals Vout+ and Vout−.

The OVP circuit 220 includes the voltage input terminal Vin+, a reference voltage input terminal Vref, two first connection ends A1, B1, two second connection ends A2, B2, a comparator U1, a bipolar junction transistor (BJT) Q1, five resistors R7, R8, R9, R10 and R11, two capacitors C10, C11, a pulse width modulation (PWM) controller, and a switch element M1. The first connection ends A1, B1 are respectively connected to the voltage input terminal Vin+ and the positive terminal of the comparator U1. The second connection ends A2, B2 are respectively connected to the positive terminal of the comparator U1 and the output terminal of the comparator U1. The resistor R7 is connected between the reference voltage input terminal Vref and the negative terminal of the comparator U1. The resistor R8 is connected between the positive terminal of the comparator U1 and ground. The capacitor C10 is connected in parallel with the resistor R8. The voltage input terminal of the comparator U1 is connected to a voltage of 12 volts and grounded through the capacitor C11. In one embodiment, the reference voltage is approximately 15 volts.

The output terminal of the comparator U1 is connected to the base of the BJT Q1. The resistor R10 is connected between the base and the emitter of the BJT Q1. The emitter of the BJT Q1 is grounded and the collector is connected to an input terminal of the PWM through the resistor R11.

The switch element M1 includes a first end, a second end, and a third end. The first end connects to the second end when the third end receives a high level voltage. In one embodiment, the switch element M1 is an NMOS transistor and includes a source connection, a gate connection (labeled as K in FIG. 2), and a drain connection. The source connection of the transistor M1 is grounded, the gate connection of the transistor M1 is connected to the output terminal of the PWM controller, and the drain connection of the transistor M1 is connected to the positive terminal of the diode D3.

In use, the input terminal RA0 is connected to the connection end A of the voltage sampling unit 210. The two connection terminals VW2, VL2 of the first rheostat are respectively connected to the first connection ends A1, B1 of the OVP circuit 220. The two connection terminals VW1, VL1 of the second rheostat are respectively connected to the second connection terminals A2, B2 of the OVP circuit 220.

The voltage level which is to be regarded as the over voltage value is set to the microcontroller U11 through the voltage setting unit 120, and the over voltage value is stored in the microcontroller U11. The external power source 300 provides voltage to the voltage sampling unit 210. The voltage of the external power source 300 is detected by the microcontroller U11 through the input terminal RA0. The microcontroller U11 compares the voltage of the external power source 300 with the over voltage value. When the voltage of the external power source 300 is equal to the over voltage value, the microcontroller U11 adjusts the value of the first rheostat to a first resistance value according to a preset program to make the voltage of the positive terminal of the comparator U1 greater than the reference voltage Vref. The comparator outputs a high level signal. The BJT Q1 is on, the collector of the BJT Q1 is grounded, the PWM controller is pulled down. The PWM controller outputs a low level signal to the gate connection of the transistor M1. The transistor M1 is off and the sampling unit 210 is shut down. Thus, the power supply circuit 200 is protected from the external power source 300. The digital rheostat U22 transmits the first resistance value to the microcontroller U11. Then the first resistance value is transmitted to the display unit to be displayed, thus, the first resistance value is determined.

Then the first rheostat RX1 is maintained at the first resistance value. The recovery voltage value is set into the microcontroller U11 through the voltage setting unit 120, and the recovery voltage value is stored in the microcontroller U11. The microcontroller U11 compares the voltage of the external power source 300 with the recovery voltage value. When the voltage of the external power source 300 is equal to the recovery voltage value, the microcontroller U11 adjusts the value of the second rheostat RX2 to a second resistance value according to a preset program to make the voltage of the positive terminal of the comparator U1 less than the reference voltage Vref. The comparator outputs a low level signal. The BJT Q1 is off, the PWM controller is pulled high. The PWM controller outputs a high level signal to the gate connection of the transistor M1. The transistor M1 is on and the sampling unit 210 is working. Thus, the power supply circuit 200 can be recovered to a normal working state. Then the second resistance value is transmitted to the display unit 130 to be displayed, thus, the second resistance value is determined.

When the first resistance value and the second resistance value of the first rheostat RX1 and the second rheostat RX2 are respectively determined, two resistors which respectively have the same resistance value as the first resistance value and the second resistance value are connected to the first connection ends A1, B1 and the second connection ends A2, B2 in the OVP circuit 220. Therefore, the design of the OVP circuit 220 corresponding to the power supply circuit 200 becomes clear.

It will be understood that particular exemplary embodiments and methods are shown and described by way of illustration only. The principles and the features of the present disclosure may be employed in various and numerous exemplary embodiments thereof without departing from the scope of the disclosure as claimed. The above-described exemplary embodiments illustrate the scope of the disclosure but do not restrict the scope of the disclosure.

What is claimed is:

1. A resistance determining system for an OVP circuit comprising:
  an external power source that supplies an external voltage to the OVP circuit;
  a microcontroller connected to the external power source, the microcontroller storing an over voltage value and configured to detect a voltage of the external power source and compare the voltage of the external voltage with over voltage value;
  a digital rheostat connected to the microcontroller, the digital resistor comprising a first rheostat having two connection terminals respectively connected to two first connection ends of the OVP circuit, the microcontroller configured to adjust a resistance of the first rheostat to be a first resistance value to activate the OVP circuit when the external voltage is substantially equal to the over voltage value; and
  a display unit connected to the microcontroller and configured to display the first resistance value.

2. The resistance determining system of claim 1, wherein the microcontroller further stores a recover voltage value that is less than the over voltage value, the digital rheostat further comprises a second rheostat having two connection terminals respectively connected to two second connection ends of the OVP circuit, the microcontroller configured for adjusting the second rheostat to be a second resistance value to turn off the OVP circuit if the voltage of the external power source being substantially equal to the recover voltage value, the display unit further configured to display the second resistance value.

3. The resistance determining system in claim 1, further comprising voltage setting unit, the voltage setting unit configured for setting the over voltage value and the recover voltage value into the microcontroller.

4. The resistance determining system in claim 2, wherein the OVP circuit comprise a voltage input terminal, a reference voltage input terminal, a comparator, a BJT, a PWM controller, and a switch element; the voltage input terminal is connected to the external power source, the reference voltage input terminal is connected a reference voltage, the first resistor is connected between the voltage input terminal and the positive terminal of the comparator; the second resistor is connected the positive terminal of the comparator and the output terminal of the comparator, a base of the BJT is connected to the output terminal of the comparator, a emitter of the BJT is grounded, the collector of the BJT is connected to a comp pin of the PWM controller.

5. The resistance determining system in claim 4, wherein the switch element is a NMOS transistor and includes a source connection, a gate connection, and a drain connection, the source connection of the transistor is grounded, the gate connection of the transistor is connected to the output terminal of the PWM controller, and the drain connection of the transistor is connected to a voltage sampling unit.

6. The resistance determining system in claim 5, the voltage sampling unit is connected to the external power source and the microcontroller, the voltage sampling unit is configured to input the voltage of the external power source into the microcontroller.

* * * * *